United States Patent [19]

Stadler et al.

[11] 3,875,003
[45] Apr. 1, 1975

[54] PROCESS FOR THE PREPARATION OF PROSTAGLANDIN

[75] Inventors: Istvan Stadler, Gabor Kovacs, Zoltan Meszaros, Julia Radoczi, Vilmos Simonidesz, Csaba Szantay, Istvan Szekely, Csaba Szathmary, all of Budapest, Hungary

[73] Assignee: CHINOIN Pharmaceutical and Chemical Works Ltd., Budapest, Hungary

[22] Filed: Sept. 11, 1972

[21] Appl. No.: 288,091

[30] Foreign Application Priority Data
Sept. 28, 1971 Hungary.............................. CI-1167

[52] U.S. Cl................ 195/30, 195/63, 195/DIG. 11
[51] Int. Cl............................................... C12d 1/02
[58] Field of Search............................ 195/30, 51 R

[56] References Cited
UNITED STATES PATENTS
3,726,765    4/1973    Leeming et al....................... 195/30

*Primary Examiner*—Alvin E. Tanenholtz
*Attorney, Agent, or Firm*—Karl F. Ross; Herbert Dubno

[57] ABSTRACT

A process for producing a prostaglandin, comprising decomposing an ester selected from the group which consists of:

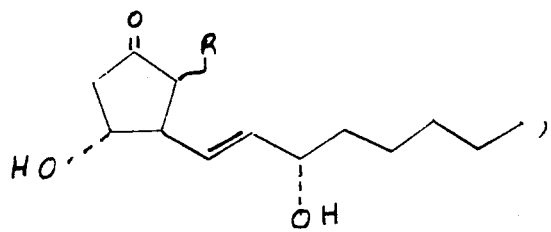

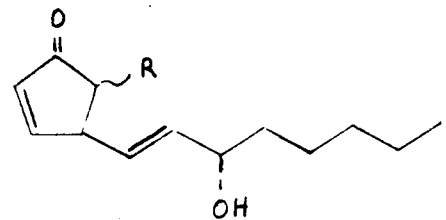

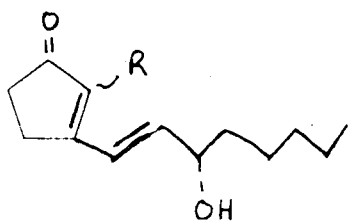

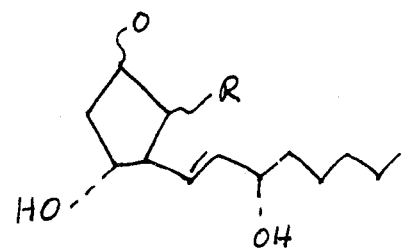

$-(CH_2)_6-COOR_1$ or $-CH_2-(CH = CH)-(CH_2)_3-COOR_1$ in $\alpha$ or $\beta$ steric position and $R_1$ is alkyl having 1 to 4 carbon atoms, at a pH between 6 and 8.5 with an ester hydrolase enzyme (EC.3.1.1) selected from the group which consists of lipase, carboxylester-hydrolase, cholesterolesterase, acetylcholinesterase and acetylesterase.

4 Claims, No Drawings

PROCESS FOR THE PREPARATION OF PROSTAGLANDIN

The prostaglandins represent an essential group of the lipids, having biological effect. The abbreviation thereof is: PG. Their structure is constituted from a prostanic acid-skeleton, consisting of 20 carbon atoms. They are classified according to the position of the double bonds and according to the steric positions of the substituents. (Prostaglandins. P. W. Ramwell et al.: Progress in the Chem. of Fats and other Lipids Vol. IX. Polyunsaturated acids part 2 p. 233.)

The physiological and the pharmacological effect of the prostaglandins lie in a wide spectrum, although the mechanism of the effect has not quite been clarified yet. The prostaglandins have an effect on the reproductive, cardiovascular, respiratory and circulatory organs. The members of the $PGE_1$-series show a stronger smooth muscle stimulating effect, than the members of the PGF-series. It has been demonstrated that $PGE_1$, $PGF_1\alpha$ and $PGA_1$ induce a decrease of the arterial blood pressure in narcotized animals.

Prostaglandin derivatives may cause therapeutic and nontherapeutic abortion, similar to oxytocin and can be used for initiating or inducing. The $PGE_1$ inhibits stomach secretion and is epinephrin antagonist (shows an antilipolytic effect). The same PG-derivative can be applied in an aerosol spray for passivating asthmatic attacks. It was also proved that the PGE-derivatives inhibit the formation of thrombosis.

The clinico-pharmacological effects have been reported in the following publications: Bergstrom et al.: Pharmac. Rev. Bd. 20. S1. (1968); Prostaglandines ed. by P. Ramwell and J. E. Shaw, Annals of the New York Academy of Sciences Vol. 180, Apr. 30, 1971.

Several total chemical syntheses have been worked out for the preparation of the prostaglandins.

In some of these methods (German Pat. No. 1,937,678) the problematic step is the preparation of the free acid from the totally synthesized PG-ester. The splitting of the ester must be carried out without damaging the end product.

According to the literature this step has been carried out chemically or by means of microbiological fermentation. The chemical hydrolysis extends the syntheses by several steps and the yield is very low.

In the microbiological technique (German Pat. No. 1,937,678) the ester-splitting is realized with the aid of an "acylase" enzyme-system from $PGE_1$-methylester. The optimal microbic strain, the *Cladosporium resinae* (C1-II, ATCC11-274) was multiplied in a suitable nutritive solution, subsequently the cells were separated by a centrifuge. After digestion of the cells in phosphate-buffer, a repeated separation follows and the floating liquid thus obtained contains the non-specific "acylase" enzym-system. The hydrolysis is carried out in this liquid (with 12 ml. of enzyme and 129 mg. of dl-$PGE_1$-methyl-ester over a period of 20 hours), and after adding acetone, the liquid is evaporated and the crude product is purified on a chromatographic column, thus 33 mg. of $PGE_1$ acid (30%) are obtained and 66 mg. of the ester are regenerated.

The present invention is directed to a process for the preparation of prostaglandins from aliphatic ester with ester hydrolase enzymes capable of acting on carboxy esters (EC.3.1.1. subclass.)

The process according to the present invention can be carried out with a lipase of microbic or animal origin, with carboxyl-ester hydrolase, acetylcholinesterase, acetylesterase. Homogeneous, commercial products are preferably used with the aid of which the PG-methylesters can be quantitatively decomposed in an aqueous suspension.

According to the present invention the application of the following enzymes were found to be particularly useful: Lipase "Saiken" A (EC.3.1.1.3.) of microbic origin, and of specific activity of 30-35 Desnuelle units, or a Pancreas Lipase, having a specific activity of 25 Desnuelle units (EC.3.1.1.3.).

The ester, which is to be decomposed, can be characterized by the general formulae

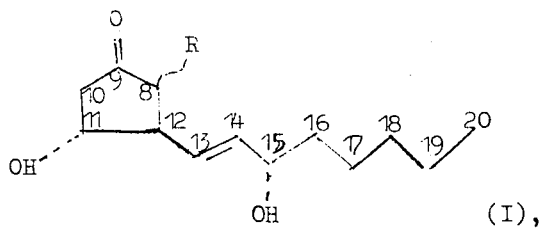

(I),

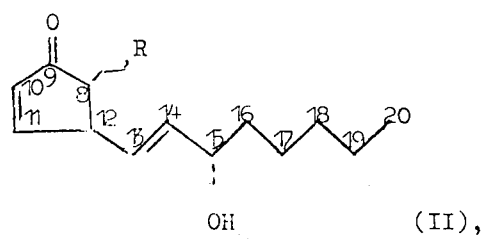

(II),

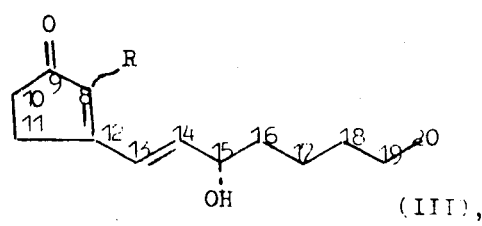

and (III),

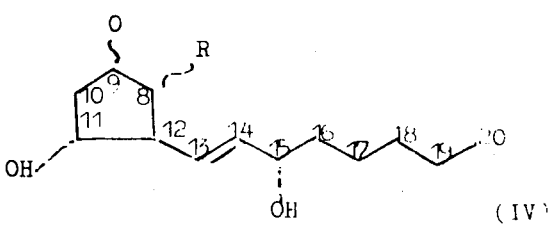

(IV)

wherein R is $-(CH_2)_6-COOR_1$ or $-CH_2-(CH=CH)-(CH_2)_3-COOR_1$ radicals and the steric structure of which can be $\alpha$ or $\beta$, $R_1$ is an alkyl group containing 1-4 carbon atoms.

Compounds of the formula I are called PGE; if R is $-(CH_2)_6-COOR_1$, they are $PGE_1$; if R is $-CH_2-(CH=CH)-(CH_2)_3-COOR_1$, they are $PGE_2$. Similarly compounds of the formula II are designated $PGA_1$ or $PGA_2$ and compounds of the formula III are named PGB$_1$ and PGB$_2$ and the compounds of the formula IV are PGF$_1$ and PGF$_2$ and according to the steric structure of the 9-OH, are the $\alpha$ and $\beta$ variations of the latter.

The aliphatic esters of the prostaglandin can be prepared by total chemical synthesis. The intermediates and the end products can be identified as known in the literature by thin layer chromatography, mass-spectrography, infra-, NMR-, and gaschromatographical determinations.

The process of the present invention is preferably carried out as follows:

The substance is hydrolyzed under pH-control at room temperature under nitrogen or argon atmosphere with an enzyme-product, having a carboxylesterhydrolase effect on the esters.

The hydrolysis is followed by thin layer chromatography or automatic alkali addition.

After the hydrolysis is ended, the reaction-mixture is extracted with a water-immiscible solvent to remove the contaminant. The aqueous phase is acidified with an acid to pH 3.5–3.0 and the PG free acid thus obtained is shaken in a water-immiscible organic solvent. The water is removed from the organic phase, the mixture is evaporated and the residue is recrystallized from a suitable solvent.

It is known that the PGE-derivatives are stabile only in the pH interval of 3 to 8 in an aqueous solution, they undergo a transformation into PGA under pH = 2 and into PGB above pH = 8, and these transformations are irreversible. That is the reason, why the ester hydrolysis must be carried out within the given pH-limits, preferably at a neutral pH value.

The process according to the present invention is carried out in a so called pH-stat, in which two sensitive electrodes are immersed in the reaction-vessel, wherein the hydrolysis is conducted. After the introduction of the substratum and of the aqueous solution of the enzyme, the pH is adjusted to any value by adding sodium hydroxide of suitable concentration from an automatic burette (pH 7.4). Subsequently the machine neutralizes automatically according to the speed of the hydrolysis, the acid set free, while maintaining the pH on the adjusted value of 7.4. The alkali consumption is registered as a function of the time. The end of the hydrolysis is indicated by the termination of the alkali consumption. The deviation from the theoretical alkali consumption - considering the pK values of the prostaglandins indicates the purity of the substance under given reaction conditions as well. The process can be used for the determination of the purity of the active ingredient too.

When selecting pH-value of the hydrolysis, the pH-optimum of the enzyme function, the pK-value of the prostaglandine derivative and the pH-stability are considered.

In addition to application for preparative purposes, the process of the present invention can also be preferably used for the separation of prostaglandins. The substance mixture of the prostaglandins is methylated according to the known process with diazomethane, subsequently the prostaglandin-methylesters are subjected to chromatography (J. Chromatog. 48, 542–544/1970/) and the separated esters are transformed quantitatively into the acid according to the present enzymatic process.

The enzyme can also be applied on a suitable carrier, while the process becomes continuous by regenerating the enzyme.

Some possibilities for the preparation of the solid enzyme products:

a. cross-linking by using diazotized polyaminostyrene;
b. the enzyme is bound to CM-cellulose, or CM-Sephadex, while transforming the Cellulose-derivative into acid azide;
c. the enzyme is closed into polyacrylamide gel capsules.

Further details of our invention are to be found in the Examples.

EXAMPLE 1

The following two solutions are prepared:

A. 20 mg. (54.10$^{-5}$ moles) of natural 1-PGE$_1$-methylester (obtained from natural 1-PGE$_1$ by the reaction with diazomethane) are dissolved in 0.4 ml. of 95% ethanol and 15 ml. of distilled water are added. The emulsion is carefully adjusted to pH 7.4 and nitrogen is bubbled through the mixture for 15 minutes in order to remove the absorbed carbon dioxide.

B. 20 mg. of Nagase Saiken Lipase A (having a specific activity of 30–35 Densuelle units) are dissolved in 5 ml. of distilled water, the pH is adjusted to 7.4. The mixture is stirred at room temperature for 30 minutes.

The hydrolysis is carried out with 0.01 N sodium hydroxide at pH 7.4, placing the solutions A/ and B/ into a pH-stat system in nitrogen current at 25° ± 1°C. The end of the reaction is indicated by the termination of alkali consumption, or by approximation of the theoretical alkali consumption. After the end of automatic alkali addition, thin layer chromatography was carried out and no traces of ester could be detected. That indicates the end of the hydrolysis. Alkali consumption: 5.3 ml. of 0.01 N sodium hydroxide. Considering the pK value of PGE$_1$ acid (calculated consumption is 5.4 ml.) the attained efficiency of the hydrolysis is 98%. Reaction time: 30 minutes. After the reaction has taken place, the mixture is cooled to 0°–5°C, the pH is adjusted to 3.5 by adding 0.1 N sulphuric acid and the mixture is shaken out with cold ethyl acetate several times. The water is removed from the ethyl acetate phase, which is then evaporated at a reduced pressure and the precipitated crystals are recrystallized from the mixture of ethyl acetate and hexane. The crystals are dried. Mp.: 114°–115°C, 18.5 mg. of PGE$_1$ acid are obtained. Yield: 92.5%.

Analysis:

a. according to IR-spectrum: the product is identical with the spectrum of the reference sample
C = 1726, 1717 cm$^{-1}$.
Trans double 980 cm$^{-1}$.

b. According to thin layer chromatographical mobility (Kieselgel G-n layer; solvent system dioxane:benzene:acetic acid = 20:20:1)
reference PGE$_1$; Rf = 0.62
obtained product; Rf = 0.62.

c. The biological activity is identical with the activity of the original PGE$_1$ sample. (Guinea pig, measured by ileum contraction test.)

EXAMPLE 2

The following two solutions are prepared:

A. 129.6 ml. ($3.5 \cdot 10^{-1}$ moles) of synthetic dl-PGE$_1$ methylester of a purity of 90% are dissolved in 1.3 ml. of 95% ethanol, 30 ml. of distilled water are added. The pH is carefully adjusted to 7.4 and the mixture is flushed with nitrogen for 15 minutes.

B. 150 mg. of Nagase Saiken Lipase A are dissolved in 20 ml. of distilled water, the pH is adjusted to 7.4 and the mixture is stirred for 30 minutes.

The hydrolysis is carried out with 0.01 N sodium hydroxide as in Example 1. Sodium hydroxide consumption: 10.5 ml. (calc. 11.66 ml.). The attained efficiency of hydrolysis is 89%. Considering the efficiency based upon the starting material, the reaction may be considered quantitative. The reaction was carried out in nitrogen current. Reaction time: 180 minutes. No traces of ester could be detected on thin layer chromatography.

The reaction mixture is cooled to 0°–5°C. For removing contaminants, the mixture is shaken out with 1 × 15 ml. subsequently with 2 × 10 ml. of cooled ether. The ether phase is evaporated, 14 mg. of the product are obtained, the yield is 10.8%.

The cooled aqueous phase is acidified to pH 3.5 by adding 0.3 N sulphuric acid. The mixture is shaken out with cooled ethyl acetate (1 × 25 ml., 2 × 20 ml., 1 × 10 ml.). (According to thin layer chromatography, the PGE$_1$ acid is solubilized quantitatively from the aqueous phase in the ethyl acetate.) The water is removed from the ethyl acetate phase, the mixture is evaporated under reduced pressure, the precipitated solid crystals are recrystallized from the mixture of ethyl acetate and hexane, the crystals are dried. 105 mg. of dl-PGE$_1$ are obtained (81.8%). Mp.: 114°–115°C. The yield is 90.5% (calc. on the active ingredient).

Analysis:
a. According to IR spectrum the obtained product is identical with the natural product.
C = 0, 1726, 1717 cm.$^{-1}$
Trans double 980 cm.$^{-1}$.
b. According to thin layer chromatography the product can be considered homogenous, no further purification is necessary. The solvent system is the same as in Example 1.
Reference PGE$_1$: Rf = 0.62
the obtained product PGE$_1$: Rf = 0.62.
c. The biological activity is identical with the standard sample within the limits of error: ED$_{50}$ = 0.087 µg.

EXAMPLE 3

The following two solutions are prepared:
A. 13.6 mg. ($3.7 \cdot 10^{-5}$ moles) of dl-PGE$_1$ methylester (90%) are dissolved in 0.3 ml. of 95% ethanol and 7 ml. of distilled water are added. The pH of the emulsion is adjusted to 7.4, the mixture is flushed with nitrogen for 15 minutes.

B. 13 mg. of pancreas lipase (specific acitivity is 20–25 Desnuelle units) are dissolved in 7 ml. of distilled water, the pH is adjusted to 7.4.

The hydrolysis is followed with 0.01 N sodium hydroxide in nitrogen current at 25° ± 1°C. The measured sodium hydroxide consumption is 3 ml. (calc. 3.7 ml.). Efficiency 81%, if considering the content of active ingredient 90%. Reaction time: 80 minutes.

The reaction mixture is cooled to 0°–5°C and is further treated according to Example 2 (shaking out with ether: 1 × 50 ml., 2 × 3 ml.). The ether phase is evaporated, the weight of the residue is 2 mg., 14.5%.

The cooled aqueous phase is acidified to pH 3.5 by adding 0.1 N sulphuric acid, it is extracted with cooled ethyl acetate (1 × 5 ml., 3 × 30 ml.) and is evaporated.

The precipitated substance is crystallized from the mixture of ethyl acetate and hexane, the crystals are dried. Mp: 114°–115°C, weight 10.2 mg. (75%). The yield is 85%, calculated on the active ingredient.

Analysis:
The results of the analysis are the same as the results of the analysis obtained in Examples 1 and 2.

EXAMPLE 4

The following two solutions are prepared:
A. 20 mg. ($5.4 \cdot 10^{-5}$ moles) of synthetic dl-8-iso-PGE$_1$ methylester are dissolved in 0.3 ml. of 95% ethanol, 10 ml. of distilled water are added. The obtained emulsion is adjusted to pH 7.4, the mixture is flushed in nitrogen current for 15 minutes.

B. 20 mg. Nagase Saiken Lipase A are dissolved in 5 ml. of distilled water, the mixture is stirred for 30 minutes and the pH is adjusted to 7.4.

The reaction mixture is further treated according to the methods described in Example 2, the termination of the reaction was determined by the automatic addition of 0.01 N sodium hydroxide, consumption of sodium hydroxide is 4.32 ml. (calc. 5.4 ml.). Efficiency of hydrolysis is 80%. Reaction time: 70 minutes. The further treatment is according to Examples 1–2, the ethyl acetate phase contains according to thin layer chromatographical analysis dl-8-iso-PGE$_1$. Yield: 15 mg., 75%. Mp.: 101°–102°C.

Analysis:
The mass spectrum, the IR spectrum and the thin layer chromatographical mobility of the product are identical with those of the natural isomer.

EXAMPLE 5

The following two solutions are prepared:
A. 40 mg. ($10.8 \cdot 10^{-5}$ moles) of synthetic dl-PGE$_2$-methylester are dissolved in 0.4 ml. 95% ethanol and 20 ml. of distilled water are added. The obtained emulsion is adjusted to pH 7.4 and flushed with nitrogen current for 15 minutes.

B. 40 mg. of Nagase Saiken Lipase A are dissolved in 20 ml. of distilled water, stirred for 30 minutes at pH 7.4. The termination of the reaction is followed with 0.01 N sodium hydroxide, the pH is adjusted to 7.4. Consumption as in the above Example. Efficiency 82%. Reaction time 120 minutes.

The reaction mixture is cooled to 0°–5°C, and is acidified to pH 3.5 by adding 0.01 N sulphuric acid.

The mixture is shaken out with 1 × 20 ml., 3 × 10 ml. ethyl acetate, the ethyl acetate phase is evaporated and the precipitated crystals are recrystallized from the mixture of ethyl acetate and hexane. The precipitated colourless crystals are dried. Mp.: 64.5°–66°C. Yield: 32. mg., 81%.

Analysis:
According to thin layer chromatographical mobility.
Reference PGE$_2$: Rf = 0.62
obtained product PGE$_2$: Rf = 0.62
solvent system: benzene:dioxane:acetic acid = 20:20:1.

EXAMPLE 6

The following two solutions are prepared:
A. 30 mg. ($8.35 \cdot 10^{-5}$ moles) of synthetic dl-PGF$_{1\alpha}$ methylester are dissolved in 0.2 ml. of 95% ethanol and 15 ml. of distilled water are added, the pH is adjusted to 7.4, the mixture is flushed in nitrogen current.

B. 30 mg. of Nagase Saiken Lipase A are dissolved in 8 ml. of distilled water as described above.

The hydrolysis is carried out according to Examples 1 to 2. The consumption of 0.01 N sodium hydroxide is 7.4 ml. (calc. 8.35 ml.). Efficiency 89%, reaction time 90 minutes. The mixture is further treated according to Example 5. 23 mg. of the product are obtained. (76%) Mp.: 102°-103°C.

Analysis:
According to thin layer chromatographical mobility.
Obtained product: Rf = 0.45
reference sample: Rf = 0.45
in the solvent system given in Example 5.

EXAMPLE 7

One proceeds as described in the preceding Examples. 20 mg. (5.3.10$^{-5}$ moles) of dl-PGA$_1$ methylester are dissolved in 0.2 ml. ethanol +15 ml. of water. 20 mg. of Nagase Saiken Lipase A are dissolved according to the method described above, and flushed in nitrogen current.

The hydrolysis is carried out as described above, consumption of 0.01 N sodium hydroxide is 4.67 ml. (calc. 5.3 ml.). Efficiency of hydrolysis: 88%.

The reaction mixture is cooled, and acidified to pH 3.5 by adding 0.1 N sulphuric acid. The mixture is extracted with cooled ether several times. The ether phase is evaporated, the precipitated crystals are dried. Yield: 16 mg., 80%. Mp.: 42°-44°C.

Analysis:
The product was identified according to IR-spectrum in comparison with natural PGA$_1$.
1703, 1719, 1585, 979, 972 cm$^{-1}$.
UV spectrum
Max = ethanol = 217 nm = 10.900.

EXAMPLE 8

One proceeds as described in the preceeding Examples. 20 mg. (5.3.10$^{-5}$ moles) of PGB$_1$ methylester are dissolved in 0.2 ml. of ethanol and in 15 ml. of distilled water.

20 mg. of Nagase Saiken Lipase A are dissolved in 5 ml. of distilled water. The hydrolysis is carried out according to Example 7. Efficiency 82%, reaction time 70 minutes.

The further treatment of the mixture is identical with that of described in Example 6. Yield: 17 mg., 82%. Mp.: 70°-71°C.

Analysis:
According to thin layer chromatographical mobility.
Natural PGB$_1$: Rf = 0.50
Obtained product PGB$_1$: Rf = 0.50
Solvent system ethyl acetate.
IR spectrum: identical with that of the natural sample.
1725, 1668, 1635, 1596, 970 cm.$^{-1}$.

What we claim is:

1. A process for producing a prostaglandin, comprising hydrolyzing an ester selected from the group which consists of:

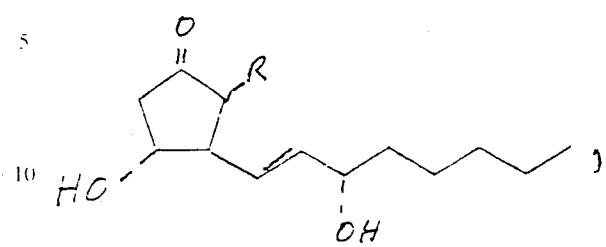

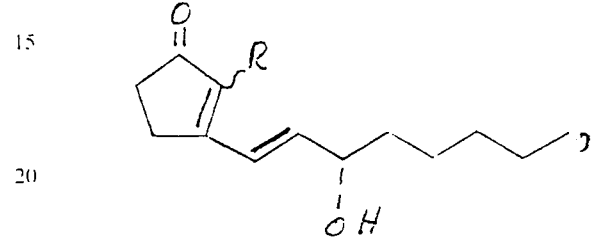

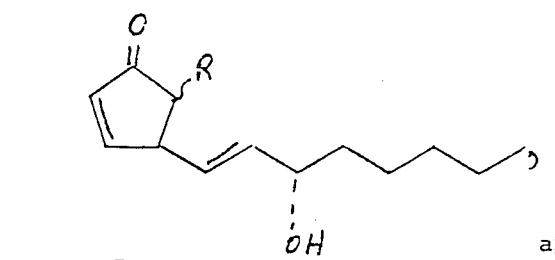

and

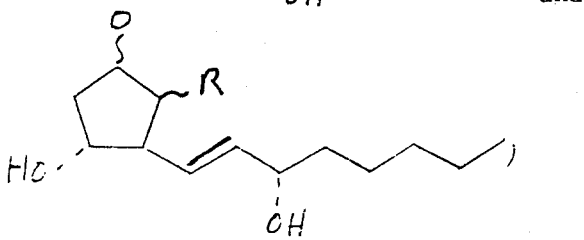

wherein R is —(CH$_2$)$_6$—COOR$_1$ or —CH$_2$—(CH = CH)—(CH$_2$)$_3$—COOR$_1$ in α or β steric position and R$_1$ is alkyl having 1 to 4 carbon atoms, at a pH between 6 and 8.5 with an ester hydrolase enzyme (EC.3.1.13) selected from the group which consists of lipase SAIKEN A of 30 to 35 Desnuelle units specific activity and pancreas lipase of 25 Desnuelle units specific activity, and recovering the resulting prostaglandin acids.

2. The process defined in claim 1 wherein said enzyme is lipase Saiken A having a specific activity of 30 to 35 Desnuelle units.

3. The process defined in claim 1 wherein said enzyme is pancreas lipase having a specific activity of 25 Desnuelle units.

4. The process defined in claim 1 wherein said enzyme is provided on a solid carrier.